Sept. 12, 1933.                N. E. BUNTING                1,926,709
                        COMBINE HARVESTER CONSTRUCTION
                            Filed Aug. 5, 1931            3 Sheets-Sheet 1

INVENTOR:
Norman E. Bunting,

BY *Chas W. Gerard.*
        ATTORNEY.

Sept. 12, 1933.  N. E. BUNTING  1,926,709
COMBINE HARVESTER CONSTRUCTION
Filed Aug. 5, 1931   3 Sheets-Sheet 2
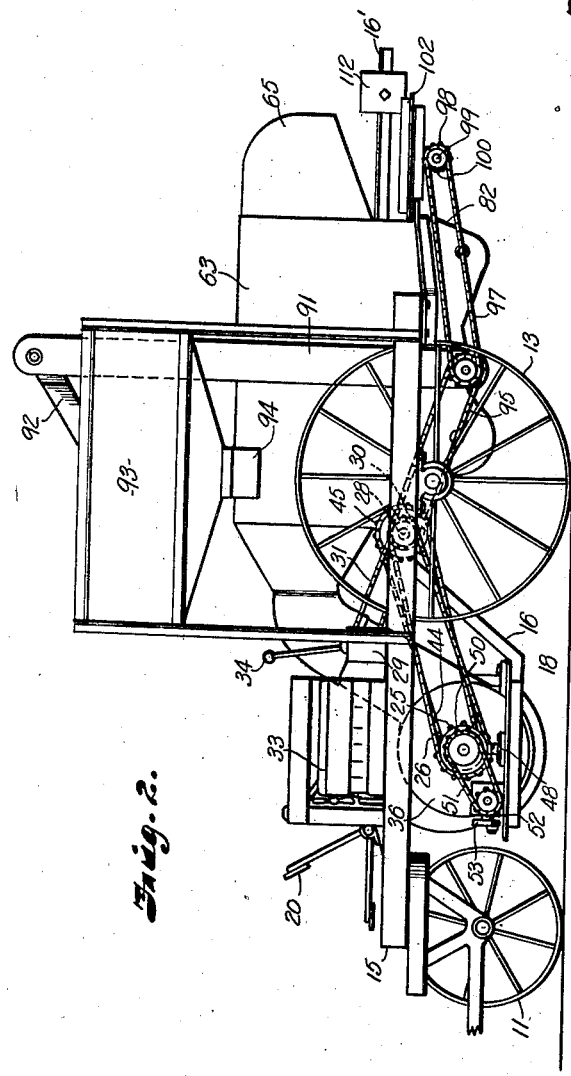
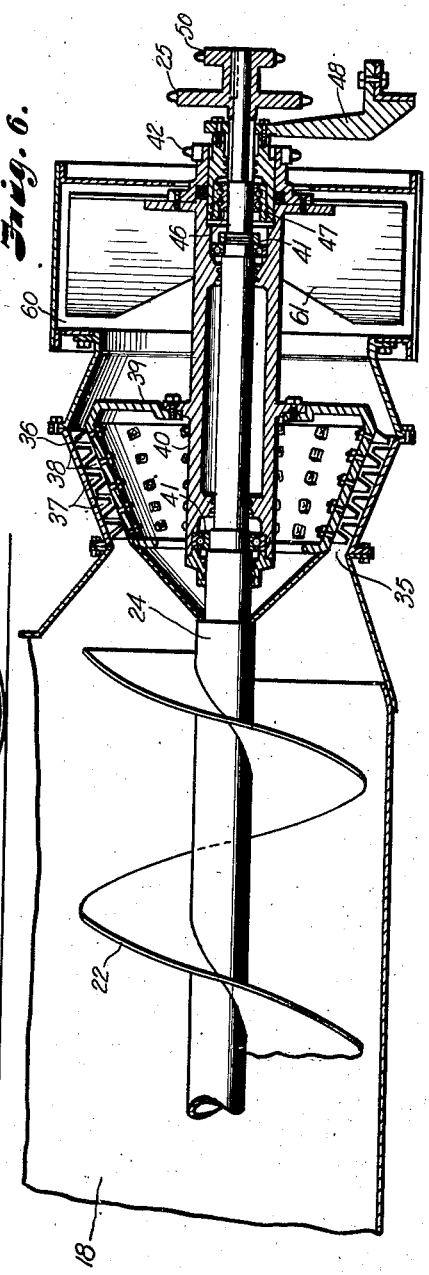
INVENTOR:
Norman E. Bunting,
BY Chas. W. Gerard
ATTORNEY.

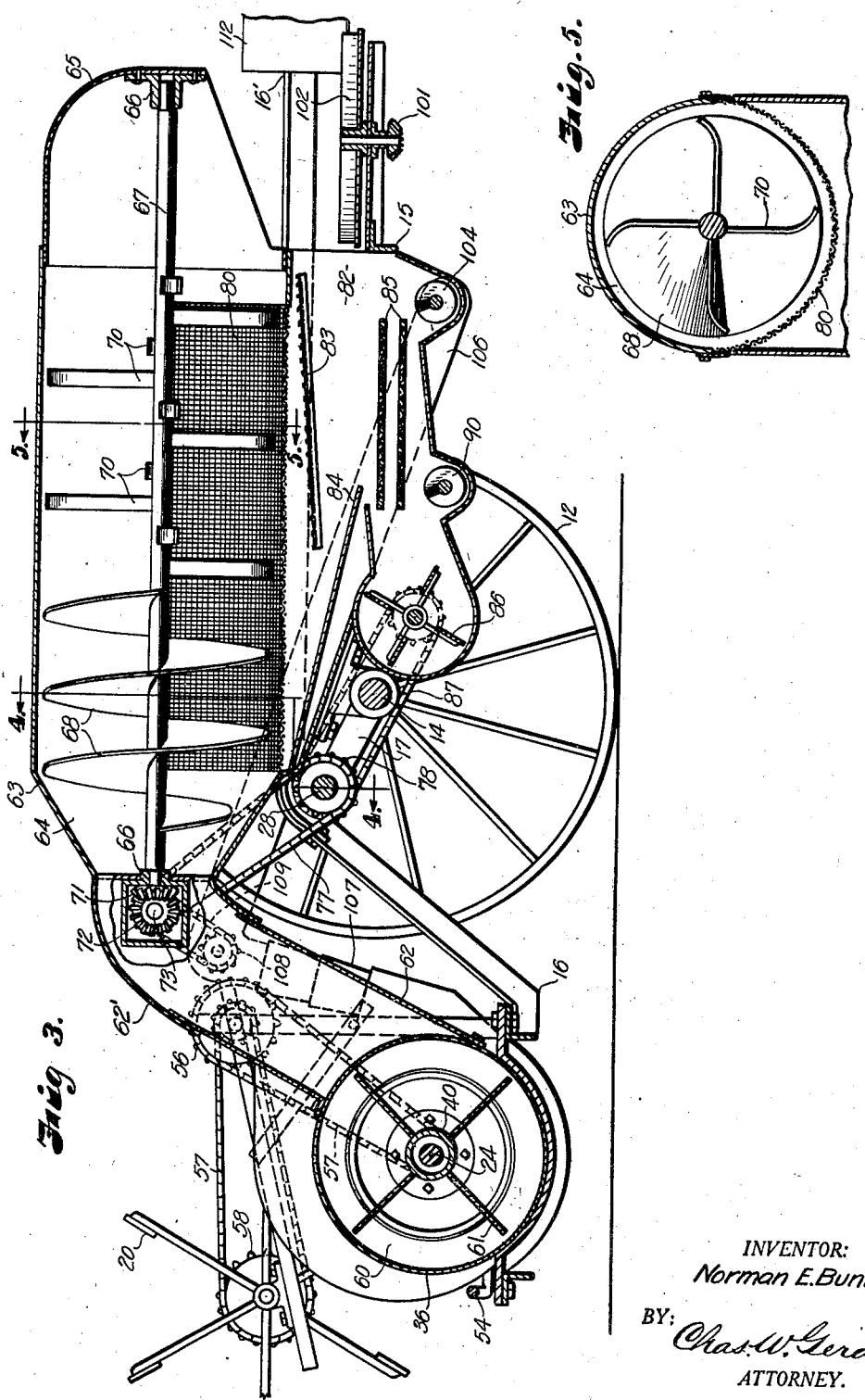

Patented Sept. 12, 1933

1,926,709

UNITED STATES PATENT OFFICE 1,926,709

COMBINE HARVESTER CONSTRUCTION

Norman E. Bunting, Ottawa, Kans.

Application August 5, 1931. Serial No. 555,258

18 Claims. (Cl. 56—20)

The present invention relates to harvesting apparatus, and aims to provide a novel and improved harvester construction of the so-called combined harvester and thresher type, but characterized by various features of improvement in the way of simplicity and compactness of construction and increased efficiency of operation.

Accordingly, I have devised an apparatus of this character in which the grain cutting mechanism feeds the grain in a direct line to the thresher compartment, and the operations of threshing and separating the grain are carried on, while the movement of the grain is confined to as direct a path as possible throughout the travel of the grain through the machine.

One of the characteristic features of the improved apparatus is the provision of a thresher cylinder and fan mounted coaxially with the spiral feeding conveyer on the cutting platform.

The invention also comprises various features of improvement in the construction of the separator unit through which the grain is carried in a substantially direct path from the fan adjoining the thresher cylinder, and the movement of the material through the separator unit is maintained by the conjoint action of said fan and the moving parts within the separator chamber.

In the construction illustrated as typical of the invention, the parts of the cutting mechanism, thresher and fan units, are supported for suitable relative movement, independent of the separator construction, provision being made in the arrangement of the drive connections for compensating for this movement, and also for maintaining uninterrupted movement of the grain material through the machine.

With the foregoing general objects in view, as well as various minor objects as will appear in the course of the detailed specification, the invention will now be described by reference to the accompanying drawings, illustrating one form of construction suitable for the embodiment of the several improved features of the invention, after which those features and combinations deemed to be novel will be set forth and claimed.

In the drawings—

Figure 1 is a plan view of a combined harvester and thresher construction embodying the present improvements;

Figure 2 is a side elevation of the same;

Figure 3 is a vertical sectional view, representing a section taken on the line 3—3 of Figure 1, on a larger scale;

Figures 4 and 5 are detail sections on the lines 4—4 and 5—5, respectively, of Figure 2; and Figure 6 is an enlarged sectional detail view taken on the line 6—6 of Figure 1.

Referring now to the drawings in detail, a supporting framework of any appropriate and practical design may be employed for carrying the operating parts upon the front castor wheel 11 and main supporting wheels 12 and 13, respectively, mounted upon the axle 14. This framework may comprise a main frame 15 connected directly to the axle and an auxiliary frame 16 pivotally supported upon arms 17 carried by the axle, and providing an axis for said pivotal frame 16 slightly forward of the axle, as shown in Figures 1 and 3.

At the front of the pivotal frame 16 is provided the usual cutting platform 18, sickle bar 19, grain reel 20 and spiral or screw conveyer 22 in their usual operative relationship, said conveyer being operated by a drive shaft 24 having a sprocket member 25 at one end thereof driven by a chain 26 from another sprocket member 27 on a jack shaft 28 mounted in alinement with the axis of said frame 16 (Figure 1). The shaft 28 carries another sprocket 30 driven by a chain 31 from a sprocket 32 forming parts of a transmission device 29 driven from a motor 33 mounted on the frame 15 and provided with a shift lever 34.

In the present improved construction the conveyer 22 discharges the cut grain directly into a thresher chamber 35 formed within a housing structure 36 provided with the internal teeth 37 cooperating with the teeth 38 of a cylinder 39 carried by a sleeve 40 having an end sprocket 42 driven by a chain 44 from a sprocket 45 on the shaft 28. Combination ball-bearing and thrust collar structures 41 are provided for journaling the sleeve 40 upon the shaft 24, the outer end of which in turn is journaled in a ball-bearing 46 fitted within a sleeve 47 secured to a bracket stand 48 carried by the frame 16, said sleeve 47 fitting within the outer end of the sleeve 40 as shown in Figure 6. The adjacent or outer end of said shaft is provided with a sprocket 50 connected by a chain 51 with a sprocket member 52 which is geared to an eccentric 53 for operating the sickle bar 19 through a pitman connection 54 (Figure 1). The other end of the conveyer shaft 24 carries a sprocket 55 operating through sprockets 56 and chains 57 to drive a sprocket 58 secured to one end of the reel 20.

The housing structure 36 also provides a fan chamber 60 in receiving relation to the thresher chamber 35, and enclosing a fan structure comprising suitable blades 61 carried by the sleeve 40.

A discharge conduit, composed of suitably telescoping sections 62 and 62', connects with the upper rear side of the fan chamber 60 and extends upwardly and rearwardly the proper distance for discharging into the forward end of a separator unit comprising a housing 63 also carried by the frame 15 and forming a separator chamber 64, said housing 63 being open at the bottom and provided with a hood extension 65 and also with bearings 66 for supporting a longitudinal shaft 67 carrying an appropriate number of turns of a screw conveyer structure 68 at the receiving end of said chamber 64, while through the remainder of said chamber the shaft is provided with a spirally arranged series of combination beating and feeding arms 70. The forward end of the shaft 67 is provided with a bevel pinion 71 meshing with a pinion 72 on a counter shaft 73 mounted in bearings 74, 75, said shaft 73 having a sprocket 76 driven by a chain 77 from a sprocket 78 on the shaft 28 (Figures 1 and 4).

The lower portion of the separator member is enclosed by a semicylindrical screen 80 forming a partition between said chamber 65 and a cleaning shoe compartment 82 of conventional form comprising a sieve member 83, inclined baffle plate 84 and shaker members 85 located opposite a fan 86 which is driven by a sprocket chain 87 from a sprocket 88 from the shaft 28. A grain auger 90 delivers the grain to an elevator 91 which discharges through a chute 92 into a hopper 93 carried by the main platform 15 in elevated position over a platform space beneath the discharge mouth 94 of the hopper, as shown in Figure 2. This auger and elevator are also operated by a chain 95 from a sprocket 96 on the shaft 28, and in turn operate a chain 97 leading to a sprocket 98 on a shaft 99 provided with a bevel gear 100 meshing with a bevel gear 101 which drives a straw spreader device 102 mounted at the discharge end of the cleaning compartment 82 and beneath the hood member 65 at the end of the housing 63.

A tailings auger 104, also mounted in the bottom of said compartment 82, delivers the tailings to an elevator 106 provided with a flexible discharge spout 107 for returning said tailings to the discharge end of the screw conveyer 22, as represented in Figure 3, this conveying mechanism being operated by a drive consisting of a sprocket 108 at the head of said elevator and a chain 109 driven from a sprocket 110 on the shaft 73 (see Figure 1). Any appropriate conventional means (not shown) may be provided for effecting the desired adjustment of the movable framework upon the supporting arms 17.

With the foregoing construction, it is apparent that the auxiliary framework 16 and the various parts of the equipment supported thereby are permitted a certain degree of pivotal movement relative to the remainder of the apparatus, for accommodating the cutting mechanism and adjacent parts to irregularities in the ground surface or variations with the height of the grain as desired, and the weight of the parts carried by said frame may be counterbalanced to a certain extent by means of a weight 112 adjustably mounted upon a rearwardly extending arm 16' (Figures 1 and 5). At the same time the location of the shaft 28 in alinement with the axis of pivotal movement of said framework 16 enables the various drive connections to be maintained as described without disturbing of any of the driving functions.

The outstanding feature of improvement in the present construction is the mounting of the threshing cylinder and also the fan 61 upon the same axis as the spiral conveyer 22, thereby bringing the thresher member 35 in direct axial communication with the discharge end of said conveyer, and thus eliminating the usual indirect feeding of the grain to the thresher zone and the extra equipment involved in such indirect method.

Greater efficiency in the feeding operation is obtained by this simplification of the construction as well as by the location of the fan 61 in the same direct alinement and in immediate axial communication with the discharge from the thresher chamber, while further gains in simplicity and economy of construction are attained in the compactness of the arrangement, and the mounting and operation of the thresher cylinder and fan by means of a single axle and common drive connection. As the cut grain is thus driven by the combined impelling action of the spiral conveyer and the pulling force of the fan through the threshing chamber and thence through the fan chamber 60, it is then carried by the driving action of the fan blast which sweeps it through the conduit 62 into the separator chamber 64. Here it meets first with the baffling action of the spiral conveyer 68, supplementing the previous threshing action, which is followed by the further feeding and agitating treatment of the arms 70. All the while the material is being impelled longitudinally through the chamber 64 in the direction of the hood 65 by the combined blast of the fan and the feeding movement of the spiral conveyer 68 and the impelling action due to the spiral arrangement of the arms 70, the combined effect of which is sufficient to offset any obstruction to such feeding movement offered by the baffling action of said conveyer 68. The lighter straw and chaff are therefore for the most part expelled through the discharge hood 65, while the grain and remaining chaff, etc., settles through the screen bottom 80 into the cleaning shoe, for further treatment according to the usual well-known practice.

It is apparent that many important advantages, both as regards improvements in the construction and efficiency in its operation, characterize the improved apparatus.

The directness of the grain's travel from the conveyer 22 through the thresher and fan chambers, and from thence practically in one sweep through the chute 62 and separator chamber 64, makes for extreme simplicity of construction with corresponding compactness of the arrangement and reduction in both number and weight of parts required; the driving mechanism is correspondingly simplified and the power required for its operation is reduced to a very material extent as compared with previous designs. One very pronounced feature of improvement is to be found in the fact that the operation of the improved construction is attended with far less dust and fog than is usually experienced with former constructions, the operation of which creates a dense cloud of chaff and dust around the machine. This gain in cleanliness of operation is no doubt to be attributed to that improvement in my design which confines the movement of the grain to as direct a path as possible through the machine during the entire threshing and separating operation, thus expediting the several steps of the same in their proper order and maintaining the opportunities for the escape of the dust and chaff particles reduced to a minimum.

While I have illustrated and described what I now regard as a thoroughly practical and efficient construction for the embodiment of the proposed improvements, it is to be understood that the form of construction shown is to be deemed merely illustrative and as susceptible of various changes or modifications within the spirit and scope of my invention; I therefore desire to reserve the right to whatever deviations from the illustrated form may fairly fall within the scope of the appended claims.

Having thus described my invention, what I claim to be new and desire to secure by Letters Patent is:

1. A combined harvester and thresher construction, comprising a spiral grain feeding conveyer, and a threshing cylinder mounted coaxially with said conveyer.

2. A combined harvester and thresher construction, comprising a spiral grain feeding conveyer, and fan and thresher units mounted coaxially with said conveyer.

3. A combined harvester and thresher construction, comprising a spiral grain feeding conveyer, a threshing cylinder mounted coaxially with said conveyer, and means for driving said threshing cylinder independently of said conveyer.

4. A combined harvester and thresher construction, comprising a spiral grain feeding conveyer, fan and thresher units mounted coaxially with said conveyer, and means for driving said fan and thresher units independently of said conveyer.

5. A combined harvester and thresher construction, comprising a spiral grain feeding conveyer, a thresher unit mounted coaxially and in receiving relation to said conveyer, and a fan unit mounted coaxially with said thresher unit and cooperating with said conveyer for impelling the cut grain through said thresher unit.

6. A combined harvester and thresher construction, comprising a spiral grain feeding conveyer, fan and thresher units mounted coaxially with said conveyer with the thresher unit between the fan and the conveyer for cooperative action of the latter in impelling the cut grain through the thresher unit, and means for driving said fan and thresher units independently of said conveyer.

7. A combined harvester and thresher construction comprising a movable cutting platform, and a spiral conveyer, threshing unit and fan unit mounted in coaxial alinement on said platform for movement in unison with the latter.

8. A combined harvester and thresher construction, comprising a spiral grain feeding conveyer, a thresher unit mounted coaxially and in receiving relation to said conveyer, a separator unit, and a fan unit mounted coaxially with said threshing unit and cooperating with said conveyer for impelling the cut grain through said thresher unit into said separator unit.

9. A combined harvester and thresher construction comprising a separator unit, a spiral grain feeding conveyer, threshing unit and fan unit mounted in coaxial relation and with the thresher unit located between the fan and conveyer for cooperative action of the latter in impelling the cut grain through said thresher unit into the separator, and conduit means providing an uninterrupted feeding connection between said fan and separator unit.

10. A combined harvester and thresher construction comprising a separator unit, and grain feeding, threshing and suction means mounted in cooperative relationship for conducting the grain through the thresher means and discharging the same into said separator unit.

11. A combined harvester and thresher construction comprising a separator unit, a cutting platform mounted for pivotal movement with relation to said separator unit, grain feeding, threshing and suction means mounted in cooperative relationship upon said platform for conducting the grain through the thresher unit and discharging the same into said separator unit, and means providing uninterrupted passage for the material from said suction means to said separator unit.

12. A combined harvester and thresher construction comprising a cutting platform, a shaft carrying a spiral conveyer journaled on said platform, and a housing mounted in alinement with said conveyer and enclosing a threshing cylinder and a fan sleeved upon said shaft.

13. A combined harvester and thresher construction comprising a cutting platform, a shaft carrying a spiral conveyer journaled on said platform, a housing mounted in alinement with said conveyer and enclosing a threshing cylinder and a fan sleeved upon said shaft, and means for driving said cylinder and fan independently of said shaft.

14. In a combined harvester and thresher construction, a separator unit, a threshing unit, and a fan chamber provided with a fan intermediate said threshing and separator units and in receiving and discharge relation therewith respectively, said separator unit and the passage through said fan chamber providing a substantially direct path for the material for enabling the fan blast to impel said material on through the separator unit.

15. In a combined harvester and thresher construction, a separator unit, a threshing unit, a fan chamber provided with a fan intermediate said threshing and separator units and in receiving and discharge relation therewith respectively, and continuously operating means within said separator unit acting to reinforce the fan blast in impelling the material through said separator unit.

16. In a combined harvester and thresher construction, a grain separator unit comprising a housing provided with a longitudinal shaft, a spiral conveyer portion carried by said shaft at the receiving end of the housing, a spiral series of beater arms carried by the remaining portion of said shaft, and means for forcibly driving the grain material to the extreme end of the housing.

17. In a combined harvester and thresher construction, a grain separator unit comprising a housing providing a separator chamber having an open bottom and a discharge outlet opening, a longitudinal shaft journaled in said chamber, a spiral conveyer portion carried by said shaft at the receiving end of the housing, a spiral series of beater arms carried by the remaining portion of said shaft, and a screen member spanning the open bottom of said chamber beneath said shaft, and means for driving the grain material into the receiving end of said chamber.

18. In a combined harvester and thresher construction, a grain separator unit comprising a housing providing a separator chamber open at its receiving and discharge ends, a rotary device journaled in said chamber and carrying a spiral conveyer portion at the receiving end and a spiral series of arms between said conveyer portion and the discharge end of the chamber, a screen member suspended beneath said rotary device, and means for generating a fan blast action for driving the grain material into the receiving end of said chamber.

NORMAN E. BUNTING.